(12) United States Patent
Bennett et al.

(10) Patent No.: US 12,135,242 B2
(45) Date of Patent: Nov. 5, 2024

(54) THERMAL QUALITY MAPPINGS

(71) Applicant: Electric Pocket Limited, Torfaen (GB)

(72) Inventors: Steven Nicholas Bennett, Gwent (GB); Iain Stuart Barclay, Gwent (GB); Richard Philip Sewell, Gwent (GB); Kevin Alan Vernon, Gwent (GB)

(73) Assignee: Electric Pocket Limited, Pontypool (GB)

(*) Notice: Subject to any disclaimer, the term of this patent is extended or adjusted under 35 U.S.C. 154(b) by 521 days.

(21) Appl. No.: 17/467,357

(22) Filed: Sep. 6, 2021

(65) Prior Publication Data

US 2021/0396585 A1 Dec. 23, 2021

Related U.S. Application Data

(63) Continuation-in-part of application No. PCT/EP2020/055097, filed on Feb. 27, 2020.
(Continued)

(51) Int. Cl.
*G01J 5/02* (2022.01)
*G01J 5/80* (2022.01)
(Continued)

(52) U.S. Cl.
CPC ............ *G01J 5/026* (2013.01); *G01J 5/025* (2013.01); *G01J 5/802* (2022.01);
(Continued)

(58) Field of Classification Search
CPC .. G01J 5/026; G01J 5/025; G01J 5/802; G01J 5/027; G01J 5/0846; G01J 5/53;
(Continued)

(56) References Cited

U.S. PATENT DOCUMENTS 5,272,340 A * 12/1993 Anbar .................. G01J 5/602
  250/339.04
5,444,241 A * 8/1995 Del Grande .......... G01N 25/72
  250/341.6
(Continued)

FOREIGN PATENT DOCUMENTS

EP          2894442 A1    7/2015
WO    WO 2011/128927 A2  10/2011

*Primary Examiner* — Nathaniel T Woodward
*Assistant Examiner* — Philip L Cotey
(74) *Attorney, Agent, or Firm* — Shumaker & Sieffert, P.A.

(57) ABSTRACT

In some examples, a method for generating an interactive three-dimensional quantitative thermal heat flow mapping of an environment comprises generating a three-dimensional representation comprising multiple surfaces defining respective boundaries of the environment, generating a thermal image representing a surface temperature at multiple points of the surfaces, determining a measure for an ambient temperature within the environment, determining respective measures for incident radiant temperature of the surfaces, determining respective measures for the emissivity of the surfaces, providing a measure of temperature outside of a surface, calculating, at each of the multiple points, a value for the instantaneous heat flow per unit area using the measures for surface temperature, ambient temperature within the environment and incident radiant temperature of the surfaces, and using the values for the instantaneous heat flow per unit area, and the measure of temperature outside of a surface, calculating respective measures for thermal transmittance at the multiple points.

20 Claims, 5 Drawing Sheets

Related U.S. Application Data (60) Provisional application No. 62/814,457, filed on Mar. 6, 2019.

(51) Int. Cl.
<table>
<tr><td>G01J 5/00</td><td>(2022.01)</td></tr>
<tr><td>G01J 5/08</td><td>(2022.01)</td></tr>
<tr><td>G01J 5/53</td><td>(2022.01)</td></tr>
<tr><td>G01N 25/18</td><td>(2006.01)</td></tr>
</table>

(52) U.S. Cl.
CPC .............. *G01J 2005/0074* (2013.01); *G01J 2005/0077* (2013.01); *G01J 5/027* (2013.01); *G01J 5/0846* (2013.01); *G01J 5/53* (2022.01); *G01J 5/80* (2022.01); *G01K 2213/00* (2013.01); *G01N 25/18* (2013.01)

(58) Field of Classification Search
CPC ............ G01J 5/80; G01J 2005/0074; G01J 2005/0077; G01K 2213/00; G01N 25/18
See application file for complete search history.

(56) References Cited

U.S. PATENT DOCUMENTS

| | | | |
|---|---|---|---|
| 7,318,671 B1 * | 1/2008 | Moghaddam | G01N 25/18 374/30 |
| 8,407,616 B2 * | 3/2013 | Bergstrom | G06T 19/00 702/132 |
| 9,823,134 B1 * | 11/2017 | Srinivas | G01J 5/10 |
| 10,753,895 B2 * | 8/2020 | Nagano | G01N 25/72 |
| 10,847,009 B1 * | 11/2020 | Sulucz | G01J 5/025 |
| 11,226,301 B2 * | 1/2022 | Doege | G01N 25/72 |
| 2006/0093222 A1 * | 5/2006 | Saffer | G06V 10/762 707/E17.093 |
| 2006/0106783 A1 * | 5/2006 | Saffer | G06F 18/40 707/E17.093 |
| 2006/0232675 A1 * | 10/2006 | Chamberlain | G01J 5/10 348/E5.081 |
| 2009/0319234 A1 * | 12/2009 | Yamada | G01N 33/6851 703/1 |
| 2010/0014746 A1 * | 1/2010 | Warnke | G01N 25/72 345/157 |
| 2010/0058222 A1 * | 3/2010 | Bergstrom | G06T 19/00 715/782 |
| 2010/0135550 A1 * | 6/2010 | Arnon | G01J 5/0025 382/128 |
| 2010/0296694 A1 * | 11/2010 | Little | G01K 17/00 382/100 |
| 2011/0261193 A1 * | 10/2011 | Agurok | G06T 7/20 348/E5.09 |
| 2013/0155248 A1 * | 6/2013 | Neeley | H04N 23/11 348/E5.09 |
| 2013/0278759 A1 * | 10/2013 | Zimmermann | G01C 7/00 348/140 |
| 2014/0267353 A1 * | 9/2014 | Schmidt | H04N 23/631 345/589 |
| 2016/0339642 A1 * | 11/2016 | Donovan | G01J 1/0242 |
| 2017/0212066 A1 * | 7/2017 | Thompson | G06T 7/0004 |
| 2020/0184632 A1 * | 6/2020 | Crane | G06T 7/586 |
| 2021/0088688 A1 * | 3/2021 | Chapman | G05B 13/048 |
| 2022/0045554 A1 * | 2/2022 | Leabman | H02J 50/80 |
| 2022/0192588 A1 * | 6/2022 | Larson | G16H 40/63 |
| 2023/0011717 A1 * | 1/2023 | Larson | A61B 5/6823 |

* cited by examiner

THERMAL QUALITY MAPPINGS

BACKGROUND

The thermal quality of a building can be characterised using a measure of thermal transmittance (or U-value). The U value provides a measure of the rate of transfer of heat through a given area of a structure at a particular location, divided by the difference in temperature across that region of the structure.

A low U-value indicates good thermal quality, typically stemming from good building insulation resulting in a low thermal transmittance. Conversely, regions with a high thermal transmittance will have a relatively higher U-value.

SUMMARY

According to a first aspect of the present disclosure, there is provided a method for generating an interactive three-dimensional quantitative thermal heat flow mapping of an environment, the method comprising generating a three-dimensional representation of the environment, the representation comprising multiple surfaces defining respective boundaries of the environment, generating a thermal image representing a surface temperature at multiple points on respective ones of the surfaces of the environment within the three-dimensional representation, determining a measure for an ambient temperature within the environment, determining respective measures for incident radiant temperature of the surfaces, determining respective measures for the emissivity of the surfaces, providing a measure of temperature outside of a surface, calculating, at each of the multiple points, a value for the instantaneous heat flow per unit area using the measures for surface temperature, ambient temperature within the environment and incident radiant temperature of the surfaces, and using the values for the instantaneous heat flow per unit area, and the measure of temperature outside of a surface, calculating respective measures for thermal transmittance at the multiple points.

In an implementation of the first aspect, determining a measure for an ambient temperature within the environment can comprise measuring a temperature of a black body radiator within the environment. Determining a measure of incident radiant temperature of the surfaces can comprise measuring a temperature of respective heat reflective structures on the surfaces. Determining a measure of emissivity of a surface can comprise measuring the IR temperature of an element of known emissivity in close thermal contact to the surface and comparing it to the IR temperature of the surface. Data can be obtained from the surface black body radiator using a machine-readable representation of data provided on the surface black body radiator. Data can be obtained from the black body radiator using a machine-readable representation of data provided on the black body radiator. Data can be obtained from respective heat reflective structures using machine-readable representations of data provided on the heat reflective structures. The method can further comprise receiving user input representing multiple datum positions of the environment, and using the multiple datum positions, generating an initial three-dimensional representation of the environment. The method can further comprise receiving further user input representing a modification of the initial three-dimensional representation of the environment, and on the basis of the further user input, generating the three-dimensional representation of the environment. The method can further comprise using an infrared camera module, generating an infrared thermography image of the environment, and overlaying the infrared thermography image of the environment over the three-dimensional representation of the environment. The method can further comprise generating position data of user equipment relative to the three-dimensional representation of the environment, and using the position data, mapping respective portions of the infrared thermography image of the environment to the surfaces of the three-dimensional representation of the environment. The method can further comprise excluding at least part of a surface using a slider tool to select minimum and maximum temperatures of the environment. At least part of a surface be excluded by manually selecting portions of a surface using a user interface. For example, features or items in a room can be excluded, either by way of manual selection and/or using the aforementioned slider functionality, whereby to define minimum and maximum temperatures of the environment.

According to a second aspect of the present disclosure, there is provided user equipment for generating an interactive three-dimensional thermal quality mapping of an environment, the user equipment comprising a imaging module to generate image data representing an image of the environment, a processor to receive user input, and use the user input to process the image data to generate a three-dimensional representation of the environment, the representation comprising multiple surfaces defining respective boundaries of the environment, a thermal imaging module to generate a thermal image of the environment representing a surface temperature at multiple points on respective ones of the surfaces of the environment within the three-dimensional representation, generate a measure for an ambient temperature within the environment, generate respective measures for incident radiant temperature of the surfaces, an input device to receive user input representing a measure of temperature outside of a surface, wherein the processor is configured to, calculate, at each of the multiple points, a value for the instantaneous heat flow per unit area using the measures for surface temperature, ambient temperature within the environment and incident radiant temperature of the surfaces, and using the values for the instantaneous heat flow per unit area, and the measure of temperature outside of a surface, calculate respective measures for thermal transmittance at the multiple points. The processor can receive data from the imaging module representing a machine-readable representation of data provided on a black body radiator, and process the said black body data to determine an identifier associated with the black body radiator. The processor can receive emissivity structure data from the imaging module representing a machine-readable representation of data provided on a black body surface radiator, and process the said data to determine an identifier associated with the reflective structure. The processor can receive reflective structure data from the imaging module representing a machine-readable representation of data provided on a reflective structure: and process the said reflective structure data to determine an identifier associated with the reflective structure. The input device can receive user input representing multiple datum positions of the environment, and wherein the processor is further configured to, using the multiple datum positions, generate an initial three-dimensional representation of the environment. The input device can receive further user input representing a modification of the initial three-dimensional representation of the environment, and the processor can, on the basis of the further user input, generate the three-dimensional representation of the environment. The processor can overlay the thermal image of the environment over the three-dimensional representation of the environment.

According to a second aspect of the present disclosure, there is provided a non-transitory machine-readable storage medium encoded with instructions executable by a processor for generating an interactive three-dimensional thermal quality mapping of an environment, the machine-readable storage medium comprising instructions to generate a three-dimensional representation of the environment, the representation comprising multiple surfaces defining respective boundaries of the environment, generate a thermal image representing a surface temperature at multiple points on respective ones of the surfaces of the environment within the three-dimensional representation, determine a measure for an ambient temperature within the environment, determine respective measures for incident radiant temperature of the surfaces, provide a measure of temperature outside of a surface, calculate, at each of the multiple points, a value for the instantaneous heat flow per unit area using the measures for surface temperature, ambient temperature within the environment and incident radiant temperature of the surfaces, and using the values for the instantaneous heat flow per unit area, and the measure of temperature outside of a surface, calculate respective measures for thermal transmittance at the multiple points.

In an implementation of the first aspect, the black body radiator can comprise an interior to minimise heat loss between the black body radiator and surface of the environment incident to the black body radiator. The interior comprises a heat reflective surface or a solid insulating block. Generating a thermal image can comprises using an infrared thermal camera module generating a plurality of frames, each frame comprising multiple points representing a surface temperature at said multiple points of the surfaces of the environment, and generating the thermal image on the basis of the plurality of frames. Generating the thermal image on the basis of the plurality of frames can comprise determining an offset between surface temperatures between successive frames of the thermal image, and modifying the thermal image on the basis of the offset. Determining the offset can comprise determining an average offset at multiple points in an overlapping region between successive frames and/or determining a correlation between temperature distributions of successive frames. Providing a measure of temperature outside of a surface can comprise receiving temperature data from a temperature sensor.

In an implementation of the second aspect, the thermal imaging module can generate a thermal image from a plurality of frames, each frame comprising multiple points representing a surface temperature at said multiple points of the surfaces of the environment. The thermal imagining module can determine an offset between surface temperatures between successive frames of the thermal image; and modify the thermal image on the basis of the offset. The thermal imaging module can determine the offset on the basis of an average offset at multiple points in an overlapping region between successive frames, or a correlation between temperature distributions of successive frames. The user input can represent a measure of temperature outside is based on temperature data from a temperature sensor.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

The thermal quality of a building may be determined from the thermal transmittance value called the U-value. Thermal quality is also determined from the thermal resistance (R), which is given as the inverse of the U-value. A low U-value, and therefore high R-value indicates good thermal quality. Conversely a high U-value, and therefore low R-value indicates a less good thermal quality. Measurement of the thermal behaviour of a building can be performed using a heat flux meter (HFM) to determine a U-value. However, this non-invasive test can take at least 72 h to execute, and the accuracy can be as low as 14-28%. It is also not reliable for non-homogeneous building elements. An alternative technique is based on infrared thermography (IRT). Although it is generally used for qualitative analysis, quantitative internal IRT methods can be adopted for in-situ measurement of the U-value.

When used in this manner (for quantitative internal determinations), a process using IRT can proceed by obtaining multiple isolated measurements of part of a structure, which can then be used to provide an average value that enables a U-value for the part in question to be determined. For example, a wall in a building can have multiple temperature measurements taken using an IRT device in order to provide a U-value for the wall. The same process can be repeated over other discrete areas of a building where it is desired to understand the thermal quality.

According to an example, there is provided a method for generating an interactive three-dimensional thermal quality mapping of an environment. In an example, an environment can be a room inside a building a corridor, stairwell, or indeed any other internal part of a building. In another example, an environment can include part or all of the outside of a building or enclosure.

A three-dimensional representation of the environment can be generated, which comprises multiple surfaces defining respective boundaries of the environment. For example, an imaging module of user equipment, such as a smart phone for example, can be used to generate a real time image of the environment, or a portion thereof. A user can input data, using a data input device of the user equipment, such as a touchscreen, stylus, keyboard and so on, representing one or more datum positions of the environment. In an example, considering an indoor room, a datum position can comprise the corner of the room. The user can proceed to enter or otherwise indicate multiple such corners of the room in question until enough data (in the form of datum positions) is provided to enable a three-dimensional representation of the room to be generated. For example, as the user equipment is generating a real time image of the environment using an imaging module, comprising a camera for example, and presenting the image to a user using a display, the user can move the user equipment in order to alter the displayed image of the environment. Accordingly, the user can move the user equipment to show part of the environment that comprises a corner, such as a corner at the bottom of the environment where the floor meets two walls. The user can use the user input device to mark or otherwise indicate the position of this corner.

The user can then move the user equipment to display another corner of the environment. As they do so, the user equipment can be configured to display a line originating from the previously marked corner to a target position on the display that represents a cursor for example, which the user can use to point at another corner of the environment, such as the next corner where the floor meets two walls. This can be repeated until the user has marked all the bottom- (or top-) most corners of the room. When the target or cursor comes within close proximity to the first such marked datum position, the user equipment can 'snap' the cursor to that position in order to complete a portion of the three-dimensional representation of the environment. For example, considering the bottom-most corners of a room, once the user has marked the first three and proceeds to move the user equipment around to show the first point again (which will complete part of the three-dimensional representation representing the floor), the cursor can automatically snap to the first point and cause a rectangle to be formed and displayed to the user indicating an initial representation of the floor of the room.

With this part of the three-dimensional representation of the environment complete, the user can then follow the same process with upper-most corners of the room. Initially, a line can be displayed stemming from the first (and also therefore the final) point representing the corner of the floor upwards towards the first corner at the ceiling of the room. As each such corner is marked, the user equipment can display a corresponding rectangle representing the surfaces or walls of the room in question, until the user returns to the first upper-most corner, at which point the cursor snaps into this position, in the same way as before, in order to provide an initial three-dimensional representation of the environment in question.

In an example, since the corners of the room may be obscured (e.g. by furniture and so on), the initial three-dimensional representation of the environment can be modified by the user in order to better represent the environment in question.

For example, the user can use a touchscreen of the user equipment to move the lines that are provided between the corners to modify the position of the corners. This can be easily done if at least some of the corners of the room between the floor and ceiling are visible and the user is therefore able to move a line representing such a corner into the correct position. That is, since the initial three-dimensional representation of the environment is provided as a line or box drawing overlaid on top of the real time image of the environment, the user can alter the position of the initial representation whilst having sight of the actual environment on the display that is being used to perform the modification.

According to an example, the user equipment includes a position sensor that enables the position and orientation of the user equipment relative to the environment to be determined. In this way, as the user equipment is moved (e.g. rotated, translated and so on), the position of the user equipment relative to a starting point can be determined, thereby enabling tracking with respect to the starting point. Accordingly, when the user indicates the first datum position within the environment, this can be used a starting point from which the relative position/orientation of the user equipment is determined so that it is possible to accurately define the datum positions with respect to the real time image of the environment.

A method according to an example effectively provides an augmented reality view of an environment in which the environment is overlaid with a schematic representation of the environment. That is, for example, the method enables a user to generate or draw a framework over the real time image that represents the environment.

According to an example, a thermal image representing a surface temperature at multiple points on respective ones of the surfaces of the environment within the three-dimensional representation is generated. For example, a thermal imaging module, such as a thermal camera for example, can be used to generate data representing temperature at multiple points. Each point may be a pixel on the display of the user equipment for example. Thus, the thermal imaging module can generate a data representing the temperature of the environment at multiple points, which can be displayed to the user on the display. As is typical, different temperatures can be represented using different displayed colours.

The thermal image of the environment can be obtained by scanning, translating or rotating the thermal imaging module around the environment in order to obtain temperature data. That is, similarly to the generation of a three-dimensional representation of the environment, the user equipment comprising the thermal imaging module can be used to capture image data of the environment by moving the user equipment in order to thermally image the environment. In an example, multiple thermal images can be stitched together using known image stitching techniques in order to provide an overall (e.g. 360 degree) thermal image of the environment.

In an example, the thermal image of the environment can be mapped to the three-dimensional representation of the environment. For example, using the position sensor of the user equipment, when generating the thermal image data, the position of the user equipment relative to the three-dimensional representation of the environment as the thermal image data is generated will be known. Accordingly, the thermal image data can be mapped to or overlaid to the three-dimensional representation of the environment, thereby providing a three-dimensional representation of the temperature of the environment at the time of capture which can be manipulated by the user to enable the provided view to of the temperature within the three-dimensional representation of the environment to be moved around, using a touchscreen of the user equipment for example.

In an example, the three-dimensional representation of the environment thus comprises multiple surfaces defining respective boundaries of the environment. Each of these surfaces can be provided with a corresponding visual representation of the thermal data for the surface.

Figure 1:
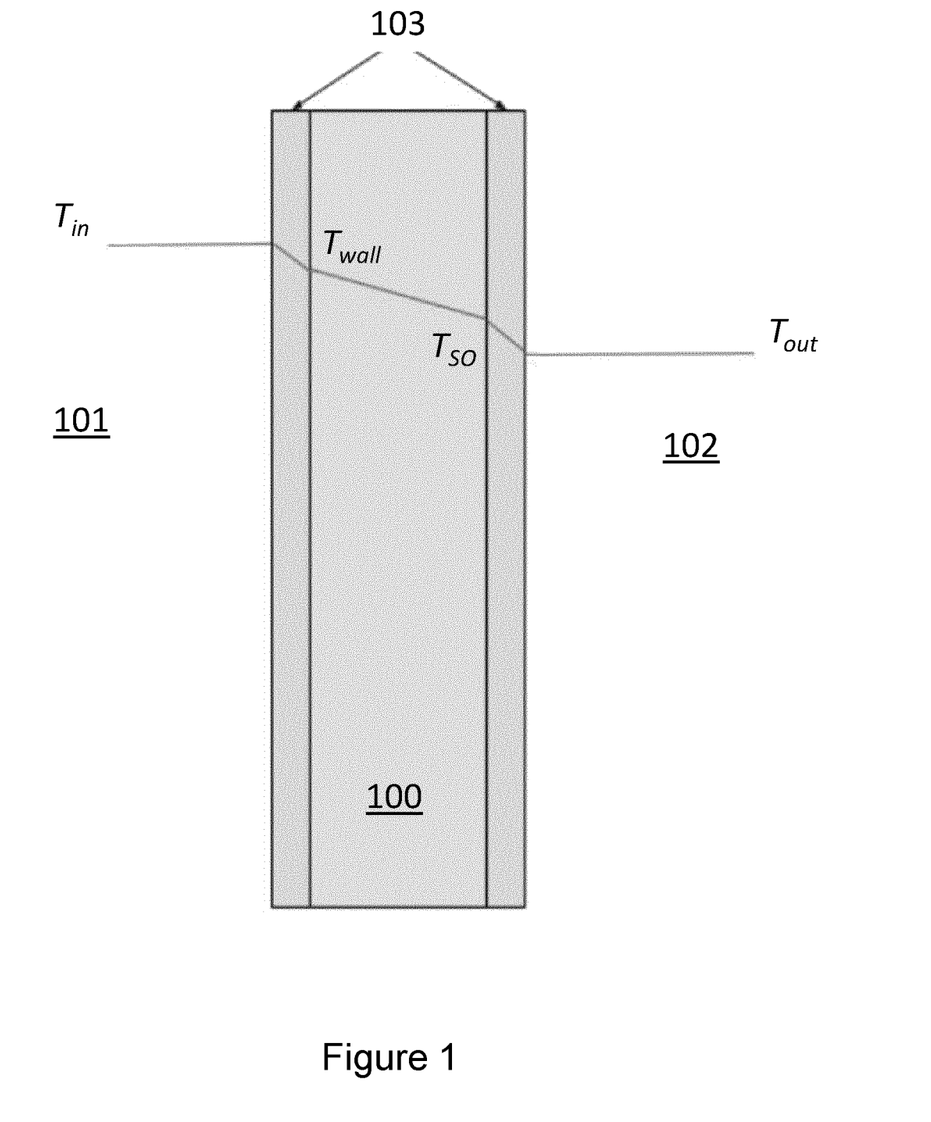
FIG. 1 is a schematic representation of a boundary in an environment, according to an example.

FIG. 1 is a schematic representation of a wall 100 of an environment according to an example. FIG. 1 shows a cross section of a boundary of part of an environment, such as a room for example, that has an inside region 101 and an outside region 102, which may be classified as outside of the room in question but still inside a building, or outside to the open environment. The boundary, in this case a wall, comprises two air boundary layers 103. In an example, the thermal imaging module measures the temperature of the surface of the wall, Twall, from the inside. Tso is the outside wall surface temperature. The wall of FIG. 1 therefore represents a surface in an environment.

A method according to an example determines the total thermal transmittance of a wall from inside the building envelope by determining the heat flow across the inside air boundary layer using measured temperature values and the calculated coefficients of heat transfer based on the physics models of radiation and convective heat transfer. According to Eq. (1), below, the radiation interchange $q_r$ between the inner wall surface and its surroundings and the convection heat transfer $q_c$ at the surface element must be obtained:

$$U_w[W/(m^2 \cdot K)] = q/(T_{in} - T_{out}) = (q_r + q_c)/(T_{in} - T_{out}) \quad (1)$$

Where $U_w$ denotes the measured U-value of the wall [W/(m²K)]; q[W/m²] is the specific heat flux through the building envelope including the specific heat flux by radiation $q_r$ [W/m²] and the specific heat flux by convection $q_c$ [W/m²]; $T_{in}$ is the air temperature near the target from inside the building [K]; $T_{out}$ is the outdoor air temperature near the target [K]; and $T_{in} - T_{out}$ is the temperature difference between inside and outside the building [K].

Radiation Heat Transfer ($q_r$):

$$q_r[W/m^2] = \varepsilon_{WALL} \cdot \sigma \cdot (T_{REF}^4 - T_{WALL}^4) \quad (2)$$

Heat transfer through radiation takes place in the form of electromagnetic waves, mainly in the infrared region. The radiation energy per unit of time from a blackbody can be expressed with the Stefan-Boltzmann Law. During the cold season, the surroundings radiate energy to a cooler object, such as an inner wall surface, which leads to a net radiation heat loss rate (Eq. 2).

In Eqn. 2, $q_r$ represents the specific heat flux by radiation [W/m²]; $\varepsilon_{WALL}$ is the emissivity coefficient of the object (0<<1, depending on the type of material and the temperature of the surface); σ is Stefan-Boltzmann's constant with a value of 5.67×10⁻⁸ [W/m²K⁴]; $T_{REF}$ denotes the reflected ambient temperature [K]; and T is the wall surface temperature from inside the building [K].

Convective Heat Transfer ($q_c$):

$$q_c[W/m^2] = h_c \cdot (T_{IN} - T_{WALL}) \quad (3)$$

The heat energy transferred between a surface and a moving fluid at different temperatures is known as convection. Considering natural convection and laminar flow, the heat transfer per unit surface through convection (Eq. (3)) is known as Newton's Law of Cooling. In the same way as in heat transfer by radiation, the cooler object is the wall to be tested.

$q_c$ belongs to specific heat flux by convection [W/m²]; $h_c$ is the convective heat transfer coefficient [W/m²K]; $T_{in}$ denotes the air temperature near the target from inside the building [K] and $T_{wall}$ is the wall surface temperature from inside the building [K]. To determine the convective heat transfer coefficient, the Nusselt number (Eq. (4)) can be used as follows:

$$N_u = (h_c \cdot L)/k \quad (4)$$

As mentioned above, $h_c$ is the convective heat transfer coefficient [W/m²K]. $N_u$ is the Nusselt number [dimensionless] and L refers to the height of the wall [m] seen from inside the building. k is the thermal conductivity of the fluid. Taking into account that the fluid is air, k is equal to 0.025 W/m K for a temperature between 20° C. and 25° C. For a surface which consists of a vertical plate such as a wall, the expression that describes the Nusselt number is the following (Eq. 5a for laminar flow ($R_a < 10^{10}$) and Eq. 5b for turbulent flow ($R_a > 10^{10}$):

$$N_u = (0.68 + 0.67 \times R_a^{1/4})/(1 + (0.492/Pr)^{9/16})^{4/9} \quad (5a)$$

$$N_u = (0.825 + 0.387 \times R_a^{1/6})/(1 + (0.492/Pr)^{9/16})^{8/27})^2 \quad (5b)$$

$$G_r = (g \cdot \beta \cdot (T_{IN} - T_{WALL}) \cdot L^3)/v^2 \quad (6)$$

$$R_a = G_r \cdot Pr = Pr \cdot (g \cdot \beta \cdot (T_{IN} - T_{WALL}) \cdot L^3)/v^2 \quad (7)$$

Where $R_a$ and Pr are the Rayleigh and Prandtl numbers respectively. The Prandtl number for air is considered to be 0.73 for an air temperature between 20° C. and 25° C. The Rayleigh number (Eq. (7)), which is the product of Grashof (Eq. (6)) and Prandtl numbers, should be $10^4 < R_a < 10^9$ for a laminar flow. It should be noted that all of these parameters are dimensionless. g refers to gravity (9.8 (m/s²). B is the volumetric temperature expansion coefficient [1/K], where all fluid properties should be evaluated at the film temperatures, so $\beta = 1/T_m$ where $T_m = (T_{IN} + T_{WALL})/2 \cdot v$ is the air viscosity with a value of $1.5 \times 10^{-5}$ m²/s for an air temperature between 20° C. and 25° C. Replacing the known values, the Rayleigh number ($R_a$) can be expressed as a function (Eq. (8)) that depends on the inner air temperature [K], the inner wall surface temperature [K] and the height of the wall L[m]:

$$R_a = 3.18 \times 10^{10} \times \beta \times (T_{IN} - T_{WALL}) \times L^3 \quad (8)$$

In an example, flow can be considered to be turbulent when $R_a > 10^9$. Accordingly, from (4) and (5b) above, the convective heat transfer coefficient for turbulent flow becomes:

$$h_c[W/(m^2 \cdot K)] = (0.825 + ((0.387 \times R_a^{1/6})/(1 + (0.492/P_r)^{9/16})^{8/27}))^2 \times k/L \quad (9)$$

Taking into account the value of the Prandtl number, Eq. (9) can be simplified to Eq. 10b:

$$h_c[W/(m^2 \cdot K)] = (0.825 + 0.387 \times R_a^{1/6})^2 \times k/L \quad (10b)$$

and for laminar flow using 5a this becomes:

$$h_c[W/(m^2 \cdot K)] = (0.68 + 0.56 \times R_a^{1/4})^2 \times k/L \quad (10a)$$

The instantaneous measured heat flow per unit area [W/m²] is denoted as q and can be calculated by (for turbulent flow):

$$q[W/m^2] = (0.825 + 0.325 \times R_a^{1/6})^2 \times k/L \times (T_{IN} - T_{WALL}) + (\varepsilon_{WALL} \times \sigma \times (T_{REF}^4 - T_{WALL}^4)) \quad (\text{Eqn. 11b})$$

and for laminar flow:

$$q[W/m^2] = (0.68 + 0.56 \times R_a^{1/4})^2 \times k/L \times (T_{IN} - T_{WALL}) + (\varepsilon_{WALL} \times \sigma \times (T_{REF}^4 - T_{WALL}^4)) \quad (11a)$$

The total heat loss ($Q_w$[W]) through a wall will be the sum of these $q_i$ for each IR pixel or virtual pixel times the area of the pixel ($A_i$) on the wall measured over the whole wall:

$$Q_w[W] = i = 1 \sum^{i=n} q_i \cdot A_i \quad (12)$$

The cost of this heat loss is then given by Eq. 13:

$$\text{Cost} = Q_w/1000 \times \text{Price per kW} \quad (13)$$

The instantaneous measured U-value of the building wall [W/(m² · K)] is denoted as U and can be calculated by Eq. (14):

$$U=((0.825+0.325 \times R_a^{1/6})^2 k/L \times (T_{IN}-T_{WALL})+(\varepsilon_{WALL} \cdot \sigma \cdot (T_{REF}^4-T_{WALL}^4))/(T_{IN}-T_{OUT})) \quad (14)$$

The averaged $U_w$ [W/(m²·K)] value over the whole wall is then given by Eq. 15:

$$U_w = \left(i=1\sum\nolimits^{i=n} q_i \cdot A_i / (T_{INi}-T_{OUTi})\right) \bigg/ \left(i=1\sum\nolimits^{i=n} A_i\right). \quad (15)$$

The wall emissivity $\varepsilon_{WALL}$ can be measured by comparing the IR temperature of a blackbody closely attached to the wall surface and the temperature of the wall surface $T_{BB}$ (e.g. thin matt black piece of card or tape) and is given by Eq. 16:

$$\varepsilon_{WALL}=T_{BB}/T_{WALL} \quad (16)$$

According to an example, user equipment comprising a thermal imaging module can be used to capture and display a three-dimensional representation of the environment, such as a room. An augmented reality representation of the environment can be provided in which the user equipment can capture and overlay an IR thermography image of the surfaces (walls, ceiling, floor etc. as desired) $T_{wall}$ onto the three-dimensional representation of the environment. In an example, the thermal imaging module can provide a temperature measurement at each IR pixel. In an example, the ambient inside temperature is measured using a blackbody radiator (e.g. black cardboard positioned inside the room (typically several cm from the wall surface), to provide $T_{in}$.

The incident radiant temperature on each wall is measured using the temperature from a heat reflective structure, such as a portion of crumpled silver foil square attached to the wall, to provide $T_{ref}$. Using a thermal imaging module, a complete model of the temperatures of all the surfaces in the room is obtained. In some cases, a virtual IR camera may be "positioned" on each point of the wall that is currently being measured and a sum across all the surfaces by their solid angle to the point is obtained. This method may be used to determine the total infra-red radiation at the point using imaging ray-tracing from the point on the wall to all the other surfaces. In this way, a more accurate measurement of $T_{ref}$ may be obtained.

In some cases, the blackbody radiator can comprise a structure defining an interior region adapted to minimise heat loss between the blackbody radiator and a surface of the environment, e.g. a surface adjacent to the black body radiator. For example, in some cases, the interior of the black body radiator can comprise a heat reflective surface or a solid insulating block.

In an example, a black body radiator can comprise a box-like structure, a cylinder, a semi-cylinder or other shape with a low thermal mass. Such a structure provides a high emissivity surface to the front face of the structure that is separated from a surface (e.g. a wall) of the environment. In an example, the separation distance of the high emissivity surface from the surface of the environment is such that the air temperature gradient therebetween is levelled out to that of the ambient temperature of the environment in question.

The thermal imaging module can be configured to generate a IR thermography image from a plurality of frames. In an example, each frame comprises multiple points representing a surface temperature on a surface of the environment.

In some examples, the thermal imaging module exhibits an instability. In an example, the measurement of surface temperatures between successive frames can introduce an error. This error can become large when measurements are taken across a whole wall surface. Herein this error is referred to as inter-frame drift.

According to examples, inter-frame drift can be accounted for by determining an overlap of surface temperature measurements between successive frames. An offset can be determined and used to modify the IR thermography image on account of the inter-frame drift between successive frames. Modifying the IR thermography image in this way can ensure a constant calibration of surface temperature measurements is maintained.

In one example, the difference between temperatures at pixels in an overlap region of a first frame and second frame are determined. The average difference is calculated to generate an offset between the first and second frames. The output image is modified based on the average difference. In a second example, the thermal imaging module is arranged to determine a correlation of pixel temperature distributions of the first and second frames to generate an offset. The output image is modified based on the offset determined according to the correlation.

Methods described herein may be used to determine when an infrared thermal imaging camera is stable for performing more accurate temperature measurements. According to examples, in some thermal imaging devices, a calibrated temperature jumps significantly after a calibration event. This may be particularly large on the first couple of calibrations after turning a device on. In particular, in some cases, it takes more than one calibration cycles to get a stable calibration.

According to examples described the calibration status of the thermal imaging device may be monitored. A survey of the accuracy of the thermal imaging device is performed after two or more calibration cycles have occurred. In this way, the stability of the thermal imaging calibration may be improved.

In an example, the blackbody radiator and heat reflective structures can include machine-readable representations of data, such as matrix codes for example. The machine-readable representations of data can encode information about the blackbody radiator and heat reflective structures. For example, they can encode information about one or more of: position of the blackbody radiator and heat reflective structures, size, identification number (e.g. each blackbody radiator and heat reflective structure can have a unique identifier to enable it to be disambiguated from others).

In an example, as the environment is scanned using the imaging module of the user equipment, in order to generate the three-dimensional representation of the environment for example, the machine-readable representations of data can be scanned and the data encoded thereon can be determined.

In one example, the outside temperature of the surface $T_{out}$ can be measured using the thermal imaging module of the user equipment or by using a thermocouple. In an example, wall emissivity can be measured by comparing the IR temperature $T_{BB}$ of a black piece of card closely attached to the wall surface and the temperature $T_{Wall}$ of the wall surface according to Eq. 16. The heat flow through an air boundary layer can then be calculated for all the points on each wall using Eq. 12, and a total and an average Heat Flow per square meter obtained and displayed to a user. A value for the cost per Kw of heat energy can be used to display the cost of the heat going through the wall (Eq. 13). The averaged U value of the wall can also be calculated using Eq. 15 and displayed.

In a further example, a temperature sensor, such as a Bluetooth® temperature sensor is used to provide alternate temperature measurements of $T_{BB}$. The measurement of $T_{BB}$ using either a thermocouple or Bluetooth® temperature sensor can be used to determine an offset in the measurement of the thermal imaging module. The offset can be applied to the measurements from the thermal imaging module to correct for an inaccuracy in the measurements produced by the thermal imaging module.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 2:
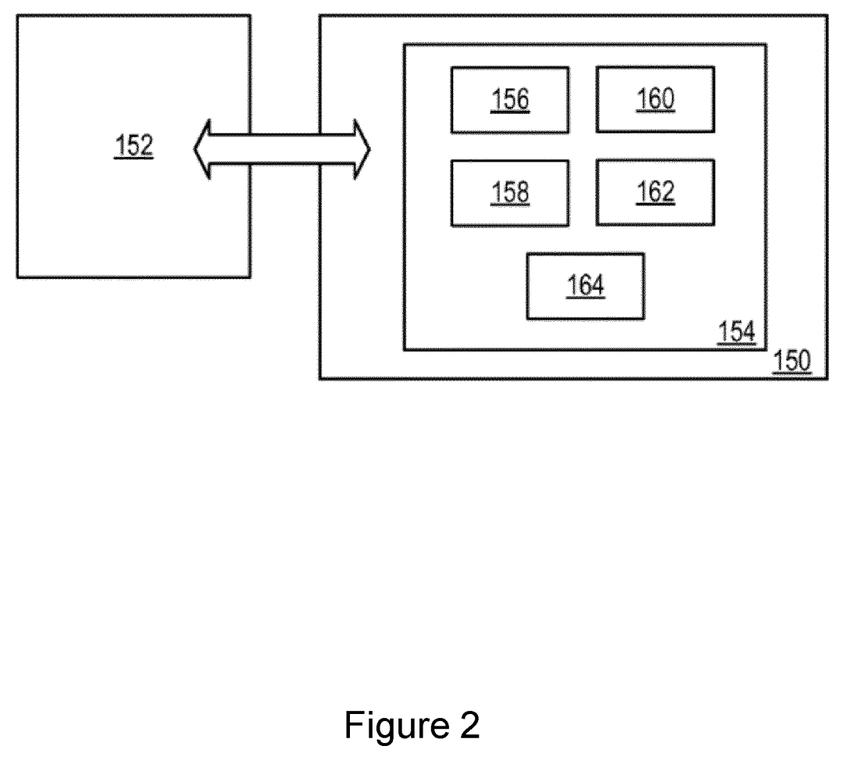
FIG. 2 is a schematic representation of a processor linked to a memory, according to an example.

FIG. 2 shows an example of a processor 150 associated with a memory 152. The memory 152 comprises computer readable instructions 154 which are executable by the processor 150. The instructions 154 comprise:

Instructions 156 to generate a three-dimensional representation of the environment, the representation comprising multiple surfaces defining respective boundaries of the environment;

Instruction 158 to generate a thermal image representing a surface temperature at multiple points on respective ones of the surfaces of the environment within the three-dimensional representation;

Instructions 162 to determine a measure for an ambient temperature within the environment; determine respective measures for incident radiant temperature of the surfaces; provide a measure of temperature outside of a surface; and Instructions 164 to calculate, at each of the multiple points, a value for the instantaneous heat flow per unit area using the measures for surface temperature, ambient temperature within the environment and incident radiant temperature of the surfaces; and using the values for the instantaneous heat flow per unit area, and the measure of temperature outside of a surface, calculate respective measures for thermal transmittance at the multiple points.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Figure 3:
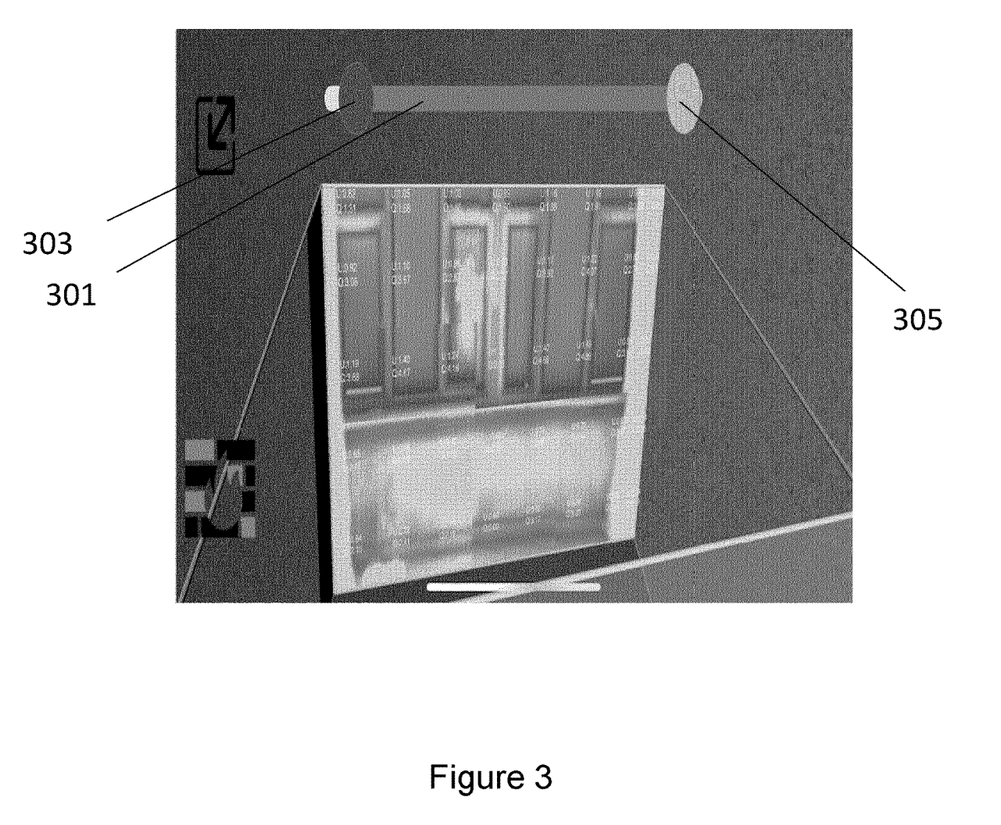
FIG. 3 is a representation of a screenshot according to an example.

FIG. 3 is a screenshot of a portion of a room, according to an example. The screenshot of FIG. 3 shows measured U values (W/m$^2$K) and Heat flow (Q, in Watts) across a wall. The screenshot of figure is a screenshot of an image displayed to a user using user equipment, such as a smart phone for example.

As can be seen, a slider tool 301 is displayed/provided. The slider tool enables modification of a range of temperature values, which temperature values are to be excluded. That is, the slider tool can be used to exclude certain areas of an environment from consideration by way of modification of a range of considered temperature values.

The slider tool can be a passive visual representation or an active controller. For example, if the display upon which the slider tool is presented to a user is touch sensitive, the slider tool 301 can be manually adjusted on the display of the user equipment by a user. In the event that the slider tool is a passive representation, other means can be used to adjust In an example, the slider tool enables a range of temperature values within an environment to be excluded. That is, the tool enables a user to quickly eliminate parts of a surface that they do not want to measure by setting minimum (303) and maximum (305) temperatures to use with the slide bar 301, thus enabling a user to eliminate certain things in an environment such as radiators, sofas or windows and so on (e.g. with windows you are essentially looking at the outside temperature).

Accordingly, by adjusting the minimum (303) and maximum (305) temperatures with the slide bar 301, a modified representation of the environment in question can be obtained. The modified representation of the environment can therefore include portions in which no U values and/or Heat flow is calculated and/or displayed. As depicted in FIG. 3, portions of the representation of the environment are simply greyed out areas, devoid of any information. An alternative is that the parts to be excluded are still displayed, but no calculations for those parts are performed, and/or they are displayed in the visible spectrum as opposed to the infra-red.

Thus, like heat sources (e.g. radiators), obstructions (e.g. sofas) and IR transparent materials like glass (e.g. windows) can be excluded. Therefore, parts of a surface you do not want to measure can be eliminated or excluded by setting the minimum and maximum temperatures to use with the slide bar at the top of the screen.

In another example, it can be possible for a user to manually exclude certain regions of a surface by drawing around an object on a surface in the model to eliminate it from the calculations. In this connection, a touch screen of a smart device for example can be used to receive user input representing a bounding region for exclusion. The user could use their finger or a stylus and so on.

Figure 4:
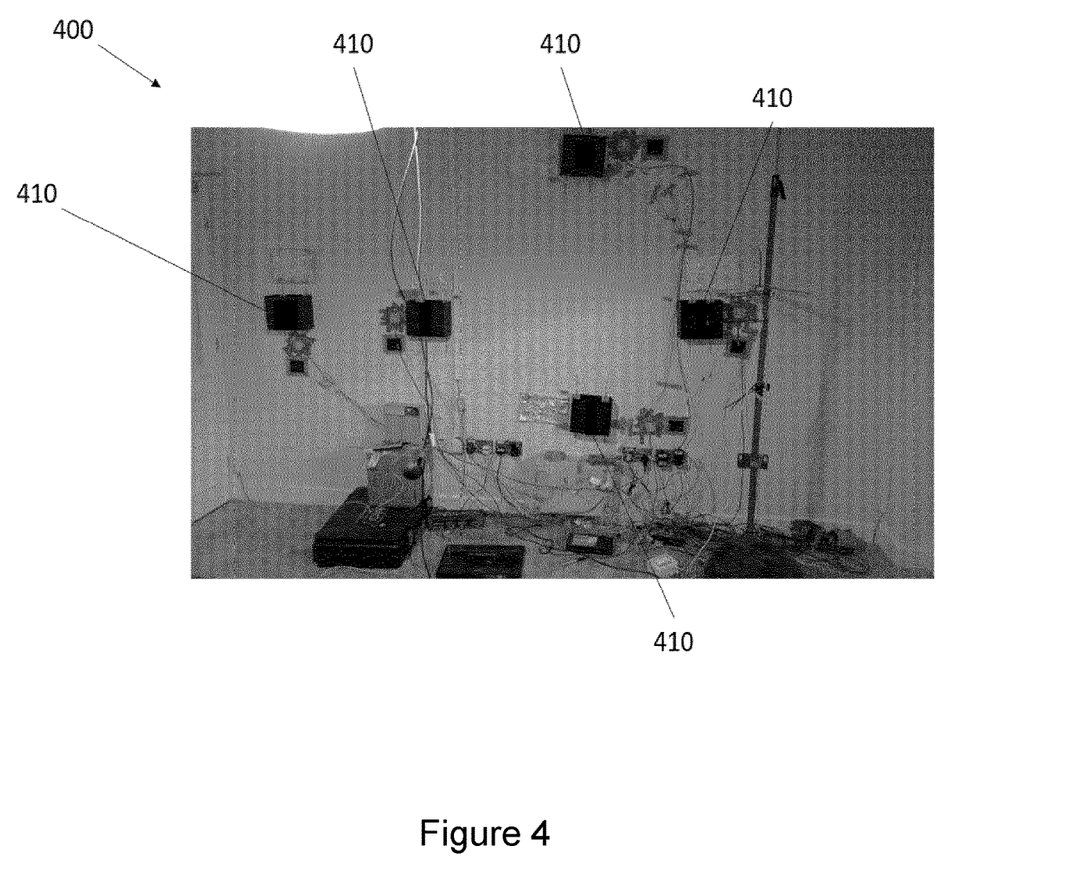
FIG. 4 is a representation of a screenshot of an environment according to an example.

FIG. 4 is a screenshot of a portion 400 of an environment, according to an example. The screenshot in FIG. 4, shows five box structures 410, which act as blackbody radiators with a high emissivity surface. The front faces of each box structure 410 are placed at a distance of approximately ten centimetres from the wall. At this distance the air temperature gradient is levelled out to that of the ambient temperature. The box structures 410 can be made out of a black cardboard or polypropylene sheet.

Figure 5:
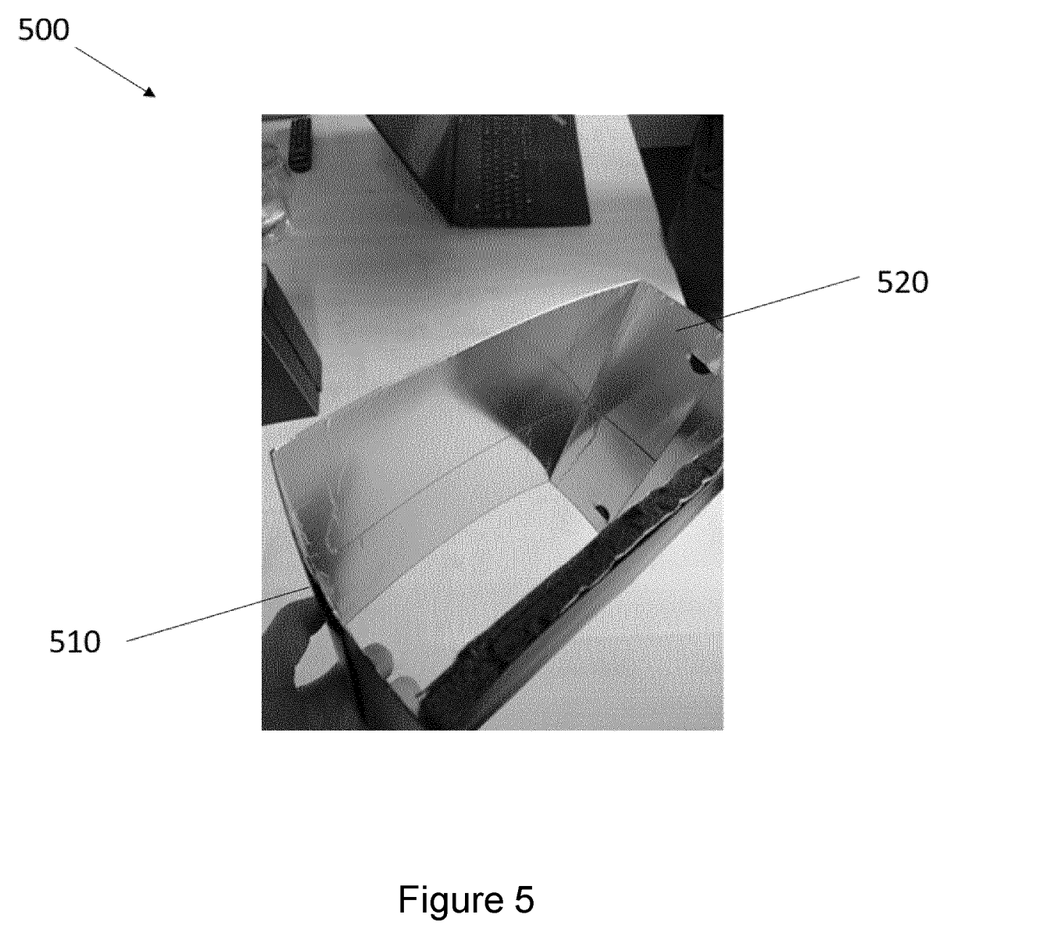
FIG. 5 is a representation of a screenshot according to an example.

FIG. 5 shows an interior region 500 of a box structure 510 similar to box structures 410 shown in FIG. 4, according to an example. In the example shown in FIG. 5, the interior 500 comprises reflective foil on the inner surfaces 520 to minimise radiative heat loss from the front surface of the structure 510 to the back surface when the box structure 510 is attached to a wall in the manner shown in FIG. 4. In another example, the interior of the box structure 510 comprises solid polystyrene or foam.

The box structures of FIGS. 4 and 5 form air temperature targets with low thermal mass and high-emissivity. The structures can be open at the top and bottom, and can comprise an IR-reflective lining. This provides two reflective surfaces to reduce radiant heat loss to, e.g., a cold wall. The front surface can be warmed (on both sides) by the ambient air moving vertically under convection.

In an example, an air temperature target having a low thermal mass and high-emissivity front surface can be supported by, e.g., a cellular or other such structure that may define multiple regions or partitions on the inside of the air temperature target. For example, a box structure can comprise multiple vertical ribs (e.g., Corex) to enable ambient air to warm both sides of the target. Such a cellular structure may have one or more vertical planes parallel to the front in order to block radiative heat transfer, and can comprise an insulating layer and/or an IR-reflective back to block heat loss to, e.g., a cold wall. In an example, an air temperature target can comprise a wireless temperature sensor to measure the temperature of the front surface of the target, which measurement can be wirelessly transmitted from the sensor.

As previously indicated measurement of the thermal behaviour of a building can also be performed using a heat flux meter (HFM) however this may take 72 hours or more and is inaccurate. If such a method is used the U value is an average U value where fluctuations due to external varying conditions are cancelled out. In contrast, if the methods described herein are used, the resultant U value measurements at any instant may differ significantly from the U value obtained from the HFM.

According to examples the methods described herein may also be used to determine an average U value where fluctuations due to external conditions are taken into account. In an example, a weighted or low pass filtered average of the history of the local external temperature over the last 24 to 48 hours leading up to an instantaneous measurement and an effective outside temperature $T_{ext\text{-}eff}$ may be used in the calculation of the U-value according to Eq. 14 and 15.

According to an example, a weighted average of the external temperature may be determined as follows. An approximate value for the thermal time constant of a wall, based on information gathered about its age and construction, is used as a sigma, σ of a standard distribution curve. The external temperatures are scaled by the normal distribution from 4σ ago to the time a survey is carried out, with the peak of the distribution at 2σ in the past. Such a weighting reflects the fact that the most recent external temperature fluctuations have little impact and the fluctuations in temperature from long ago will have decayed.

An internet weather service or a temperature sensor placed outside prior to the measurement may be used to record the external temperatures which can then be used according to the above to determine a value for $T_{ext\text{-}eff}$.

Since the heatflow Q through a wall can vary significantly over time if there is, e.g., heating (and/or cooling) cycling in the room (e.g., a central heating system), a one-off snapshot of the heat flow may not be a good basis for calculating the thermal conductivity of the wall as desired. Therefore, according to an example, heatflow (Q) measurements of a wall can be obtained automatically at predetermined intervals over a given period of time, such as every 1 minute over the course of an hour or several hours for example, thereby providing 'timelapse' measurements. The results can then be analysed in order to determine whether a heat cycle is present (i.e., whether Q fluctuates). If so, an average for Q across at least one full heating cycle can be obtained. That is, the heat cycle period can be determined according to the variation in the value of Q over the given time period, with the elapsed time between, e.g., peaks and troughs in the calculated value indicating the heat cycle period. An average value for Q can then be determined across at least one complete cycle. In an example, a heat cycle can, e.g., characterise the heating and cooling of an environment due to, e.g., central heating and/or air conditioning and so on. That is, the temperature of an environment can fluctuate. In order to account for such fluctuations, which may result from a heating and/or cooling regime, measurements of a wall can be obtained at predetermined intervals over a given period of time. Intervals can be between several seconds to several minutes for example. A given time period can be between the order of several minutes to several hours for example.

In further examples the methods and apparatus described herein may be used to determine how much forced convection is present in an environment. Forced convection may occur due to a hot fire or radiator on another wall or a large panoramic window transparent to infrared on an opposite wall of the environment. This allows a determination of the accuracy of Q and U value measurements based on whether there is likely to have been forced convection present in an environment. In another case, a model that incorporates the effects of forced convection in measurement of Q and U values may be obtained.

According to an example, a U value calculated in accordance with the methods described herein is comparable in accuracy to the standards approved ISO 9869 measured value (as tested and proven in laboratory and field trials in real buildings). The following provides an example of a survey procedure that can be followed in order to obtain such a U value. An aim is to have a wall at a stable temperature with no nett thermal capacitance heat flow (charging/discharging) over the duration of the survey. At the start of the capture of, e.g, the timelapse measurements described above, any heating for the room in question is turned off and replaced with an accurate (−0.1° C.), e.g., PID controlled heater set to the current room temperature (determined from the air target) to remove any heat cycling. In an example, a survey is best performed when a wall is not being warmed by the sun. Solar radiation on the outside of a wall will lower the measured Q and U value. Thus, either a cloudy day, a North facing or shaded wall or performing measurements at night can be more suitable. Similarly, heavy rain or strong winds on the outside wall can tend to increase the heat loss above normal and result in higher Q and U values being measured than the standard based true values. Also no solar radiation should be incident on the inside wall surface through, e.g., a window. In an example, heating should be left on for at least twice the time constant of the wall to be surveyed before starting the survey so that it is at a stable temperature. For example, if the time constant is 6 hours (typical for a, e.g., 2 layer, 25 cm brick wall) then the room should be preheated for 12 hours beforehand (ideally using a heater controlled with a PID device as noted above). When preheated, the heating for the room (if used) can be turned off, and the PID controlled heater can be turned on and set to the current room temperature (from the air target). An air temperature target, as described above, should be placed in the room in order to acclimatise to room temperature (for, e.g., 20 minutes). Timelapse measurements, as described above, can then be captured over a period of at least 1 hour, ideally 2 hours. Air, reflective, surface temperatures and Q value can be determined as described above. For a given wall for example, if Q is stable on average this indicates a good result. If Q was not stable, was not adequately pre-heated or was overheated, the measurement is unlikely to be valid for an ISO measurement. If a room is already known to be kept at a constant temperature and has been for, e.g., at least twice the wall thermal time constant then there may be no need to do the preheating or use a separate PID controlled heater so long as the Q value cycles are less than about one quarter of the timelapse period (to obtain a good average) and there is no obvious nett charging/discharging during the survey.

The teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

In an example, automatic collection and tagging of location for surveys can be provided using device location services. This can be extended to include automatic inference and logging of outside conditions from e.g. internet weather services at the location in question.

In an example, multiple scans of the same room or surface can be taken or performed at different times and/or in different conditions. Corresponding surfaces within those scans can be identified and a report on the differences in temperature, heat flow, and U-value between those scans can be generated. In an example, a mechanism which allows repeated scanning of a room to be carried out without user intervention can be provided, using (e.g.) a mechanised pan/tilt head on a tripod.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for generating, in real time, an interactive three-dimensional quantitative thermal heat flow mapping of an environment using a user equipment, the method comprising:
receiving input data at the user equipment, the input data representing one or more datum positions in a real time image of the environment, wherein the real time image of the environment is generated using an imaging module of the user equipment;
determining the relative position and/or orientation of the user equipment relative to the one or more datum positions of the environment to define the one or more datum positions with respect to the real time image of the environment;
generating a three-dimensional representation of the environment, the representation comprising multiple surfaces defining respective boundaries of the environment, wherein the boundaries of the environment are established using the one or more datum positions;
generating a thermal image representing a surface temperature at multiple points on respective ones of the surfaces of the environment within the three-dimensional representation;
determining a measure for an ambient temperature within the environment;
determining respective measures for incident radiant temperature of the surfaces;
determining respective measures for the emissivity of the surfaces;
providing a measure of temperature outside of a surface;
calculating, at each of the multiple points, a value for the instantaneous heat flow per unit area using the measures for surface temperature, ambient temperature within the environment and incident radiant temperature of the surfaces; and
using the values for the instantaneous heat flow per unit area, and the measure of temperature outside of a surface, calculating respective measures for thermal transmittance at the multiple points.

2. The method as claimed in claim 1, wherein determining a measure for an ambient temperature within the environment comprises measuring a temperature of a black body radiator within the environment.

3. The method as claimed in claim 2, further comprising obtaining data from the black body radiator using a machine-readable representation of data provided on the black body radiator.

4. The method as claimed in claim 1, wherein determining a measure of incident radiant temperature of the surfaces comprises measuring a temperature of respective heat reflective structures on the surfaces.

5. The method as claimed in claim 4, further comprising obtaining data from respective heat reflective structures using machine-readable representations of data provided on the heat reflective structures.

6. The method as claimed in claim 1, wherein determining a measure of emissivity of a surface comprises measuring the IR temperature of an element of known emissivity in close thermal contact to the surface and comparing it to the IR temperature of the surface.

7. The method as claimed in claim 1, further comprising obtaining data from a surface black body radiator using a machine-readable representation of data provided on the surface black body radiator.

8. The method as claimed in claim 1, further comprising:
using the one or more datum positions, generating an initial three-dimensional representation of the environment.

9. The method as claimed in claim 8, further comprising:
receiving further user input representing a modification of the initial three-dimensional representation of the environment; and on the basis of the further user input, generating the three-dimensional representation of the environment.

10. The method as claimed in claim 1, further comprising:
using an infrared camera, generating an infrared thermography image of the environment; and
overlaying the infrared thermography image of the environment over the three-dimensional representation of the environment.

11. The method as claimed in claim 10, further comprising:
generating position data of user equipment relative to the three-dimensional representation of the environment; and
using the position data, mapping respective portions of the infrared thermography image of the environment to the surfaces of the three-dimensional representation of the environment.

12. The method as claimed in claim 1, wherein at least one of the one or more datum positions comprises a corner of a room.

13. User equipment for generating, in real time, an interactive three-dimensional thermal quality mapping of an environment, the user equipment comprising:
an imaging device to generate image data representing a real time image of the environment; and
a processor configured to execute machine readable instructions to:
receive input data, the input data representing one or more datum positions in the real time image of the environment;
determine the relative position and/or orientation of the user equipment relative to the one or more datum positions of the environment to define the one or more datum positions with respect to the real time image of the environment;
generate a three-dimensional representation of the environment, the representation comprising multiple surfaces defining respective boundaries of the environment, wherein the boundaries of the environment are established using the one or more datum positions;
generate a thermal image of the environment representing a surface temperature at multiple points on respective ones of the surfaces of the environment within the three-dimensional representation;
determine a measure for an ambient temperature within the environment;
determine respective measures for incident radiant temperature of the surfaces;
provide a measure of temperature outside of a surface;
calculate, at each of the multiple points, a value for the instantaneous heat flow per unit area using the measures for surface temperature, ambient temperature within the environment and incident radiant temperature of the surfaces; and
using the values for the instantaneous heat flow per unit area, and the measure of temperature outside of a surface, calculate respective measures for thermal transmittance at the multiple points.

14. User equipment as claimed in claim 13, the processor further configured to receive data from the imaging device representing a machine-readable representation of data provided on a black body radiator; and process the said black body data to determine an identifier associated with the black body radiator.

15. User equipment as claimed in claim 13, the processor further configured to receive emissivity structure data from the imaging device representing a machine-readable representation of data provided on a black body surface radiator; and process the said data to determine an identifier associated with a reflective structure.

16. User equipment as claimed in claim 13, the processor further configured to receive reflective structure data from the imaging device representing a machine-readable representation of data provided on a reflective structure; and process the said reflective structure data to determine an identifier associated with the reflective structure.

17. User equipment as claimed in claim 13, wherein the processor is further configured to, using the multiple datum positions, generate an initial three-dimensional representation of the environment.

18. User equipment as claimed in claim 17, further comprising an input device further configured to receive further user input representing a modification of the initial three-dimensional representation of the environment; and wherein the processor is further configured, on the basis of the further user input, to generate the three-dimensional representation of the environment.

19. User equipment as claimed in claim 13, the processor further configured to overlay the thermal image of the environment over the three-dimensional representation of the environment.

20. A non-transitory machine-readable storage medium encoded with instructions executable by a processor for generating, in real time, an interactive three-dimensional thermal quality mapping of an environment, the machine-readable storage medium comprising instructions to:
receive input data, the input data representing one or more datum positions in a real time image of the environment, wherein the real time image of the environment is generated using an imaging device;
determine the relative position and/or orientation of the user equipment relative to the one or more datum positions of the environment to define the one or more datum positions with respect to the real time image of the environment;
generate a three-dimensional representation of the environment, the representation comprising multiple surfaces defining respective boundaries of the environment, wherein the boundaries of the environment are established using the one or more datum positions;
generate a thermal image representing a surface temperature at multiple points on respective ones of the surfaces of the environment within the three-dimensional representation;
determine a measure for an ambient temperature within the environment;
determine respective measures for incident radiant temperature of the surfaces;
provide a measure of temperature outside of a surface;
calculate, at each of the multiple points, a value for the instantaneous heat flow per unit area using the measures for surface temperature, ambient temperature within the environment and incident radiant temperature of the surfaces; and using the values for the instantaneous heat flow per unit area, and the measure of temperature outside of a surface, calculate respective measures for thermal transmittance at the multiple points.

* * * * *